US011202188B1

United States Patent
Baughman et al.

(10) Patent No.: US 11,202,188 B1
(45) Date of Patent: Dec. 14, 2021

(54) METHOD AND SYSTEM FOR PERSONALIZED EVACUATION ADVICE WITH DEEP MIXTURE MODELS

(71) Applicant: INTERNATIONAL BUSINESS MACHINES CORPORATION, Armonk, NY (US)

(72) Inventors: Aaron K. Baughman, Cary, NC (US); Shikhar Kwatra, San Jose, CA (US); John D. Wilson, League City, TX (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/948,448

(22) Filed: Sep. 18, 2020

(51) Int. Cl.
*H04W 4/90* (2018.01)
*G08B 27/00* (2006.01)
*G06K 9/62* (2006.01)
*H04W 4/029* (2018.01)

(52) U.S. Cl.
CPC .......... *H04W 4/90* (2018.02); *G06K 9/6277* (2013.01); *G08B 27/006* (2013.01); *H04W 4/029* (2018.02)

(58) Field of Classification Search
CPC ..... G08B 25/016; G06Q 90/205; H04W 4/33; H04W 4/024; H04W 4/021; H04W 4/90; H04W 76/50
See application file for complete search history.

(56) References Cited

U.S. PATENT DOCUMENTS

| 9,792,788 | B2 | 10/2017 | Joseph |
| 9,911,315 | B2 | 3/2018 | P |
| 2004/0139044 | A1 | 7/2004 | Rehwald |
| 2005/0190053 | A1* | 9/2005 | Dione .................... G08B 21/22 340/500 |
| 2007/0198168 | A1* | 8/2007 | Nathan ............ G08G 1/096811 701/117 |

(Continued)

FOREIGN PATENT DOCUMENTS

| EP | 2736027 A1 | 6/2018 |
| JP | 2004094641 A | 3/2004 |

OTHER PUBLICATIONS

Aedo, et al., "Personalized Alert Notifications and Evacuation Routes in Indoor Environments," Sensors, Jun. 2012; pp. 7804-7827, vol. 12, DOI: 10.3390/s120607804, Retrieved from the Internet: <URL: https://www.mdpi.com/1424-8220/12/6/7804>.

(Continued)

*Primary Examiner* — Dung Hong
(74) *Attorney, Agent, or Firm* — Samuel A. Waldbaum

(57) ABSTRACT

Embodiments of the present invention disclose a method, computer program product, and system for determining an evacuation destination for an evacuee. The method comprises generating a plurality of clusters for a geographical region based on data received from a plurality of mobile devices and determining the demographics for the geographical region based on generated plurality of clusters. Receiving a request for an evacuation destination from an evacuee mobile device and selecting the evacuation destination from a plurality of evacuation destination based on the demographics of the evacuee and the demographics of the geographical region. Transmitting the selected evacuation destination to the evacuee mobile device.

20 Claims, 7 Drawing Sheets

(56) References Cited

U.S. PATENT DOCUMENTS

| | | | | |
|---|---|---|---|---|
| 2009/0270065 | A1* | 10/2009 | Hamada | G01S 5/12 |
| | | | | 455/404.1 |
| 2011/0241877 | A1 | 10/2011 | Wedig | |
| 2014/0167969 | A1* | 6/2014 | Wedig | G08B 25/007 |
| | | | | 340/584 |
| 2014/0214618 | A1 | 7/2014 | Pedley | |
| 2015/0039364 | A1* | 2/2015 | Beraudier | G06Q 50/30 |
| | | | | 705/7.13 |
| 2016/0005293 | A1* | 1/2016 | Yoo | G16H 50/80 |
| | | | | 340/539.11 |
| 2016/0371966 | A1* | 12/2016 | P | G01C 21/3415 |
| 2019/0066464 | A1* | 2/2019 | Wedig | G08B 27/001 |
| 2019/0122509 | A1* | 4/2019 | Beller | G09B 21/006 |

OTHER PUBLICATIONS

Manley, et al., "Modeling emergency evacuation of individuals with disabilities (exitus): An agent-based public decision support system," Expert Systems with Applications, Jul. 2012, pp. 8300-8311, vol. 39, Issue 9, DOI: 10.1016/j.eswa.2012.01.169, Retrieved from the Internet: <URL: https://www.sciencedirect.com/science/article/abs/pii/S0957417412001972>.

Mell, et al., "The NIST Definition of Cloud Computing", National Institute of Standards and Technology, Special Publication 800-145, Sep. 2011, 7 pages.

National Fire Protection Association Emergency Evacuation Planning Guide for People with Disabilities. Guide [online], Jun. 2016, 69 pages, Retrieved from the Internet: <URL: https://www.nfpa.org/-/media/Files/Public-Education/By-topic/Disabilities/EvacuationGuidePDF.ashx>.

PTI, "3 lakh evacuated in Odisha due to cyclone 'Titli'," The Economic Times, Oct. 11, 2018 [accessed on Jun. 10, 2020], 1 page, Retrieved from URL: https://economictimes.indiatimes.com/news/politics-and-nation/3-lakh-evacuated-in-odisha-due-to-cyclone-titli/printarticle/66163056.cms>.

Occupational Safety and Health Administration, "Emergency Preparedness and Response: Getting Started Evacuation & Shelter-in-Place," United States Department of Labor, 9 pages, Retrieved from the Internet: <URL: https://www.osha.gov/SLTC/emergencypreparedness/gettingstarted_evacuation.html>.

* cited by examiner

METHOD AND SYSTEM FOR PERSONALIZED EVACUATION ADVICE WITH DEEP MIXTURE MODELS

BACKGROUND

The present invention relates generally to the field of evacuating people at the time of a disaster, and more particularly to determining an evacuation point for an evacuee based on cluster analysis of the evacuees.

During times of disaster when people need to be evacuated, an evacuee usually only know that evacuation points exist, but might not be aware of their locations. The evacuee does not have knowledge which of the points would be better suited for them and the response personnel must plan their response based on distribution of assets to each of the evacuation points evenly. This is not an efficient use of resources by the rescue personnel and it makes it harder for the evacuee to get the help they need.

BRIEF SUMMARY

Additional aspects and/or advantages will be set forth in part in the description which follows and, in part, will be apparent from the description, or may be learned by practice of the invention.

Embodiments of the present invention disclose a method, computer program product, and system for determining an evacuation destination for an evacuee. The method comprises generating a plurality of clusters for a geographical region based on data received from a plurality of mobile devices and determining the demographics for the geographical region based on generated plurality of clusters. Receiving a request for an evacuation destination from an evacuee mobile device and selecting the evacuation destination from a plurality of evacuation destination based on the demographics of the evacuee and the demographics of the geographical region. Transmitting the selected evacuation destination to the evacuee mobile device.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION

Figure 1:
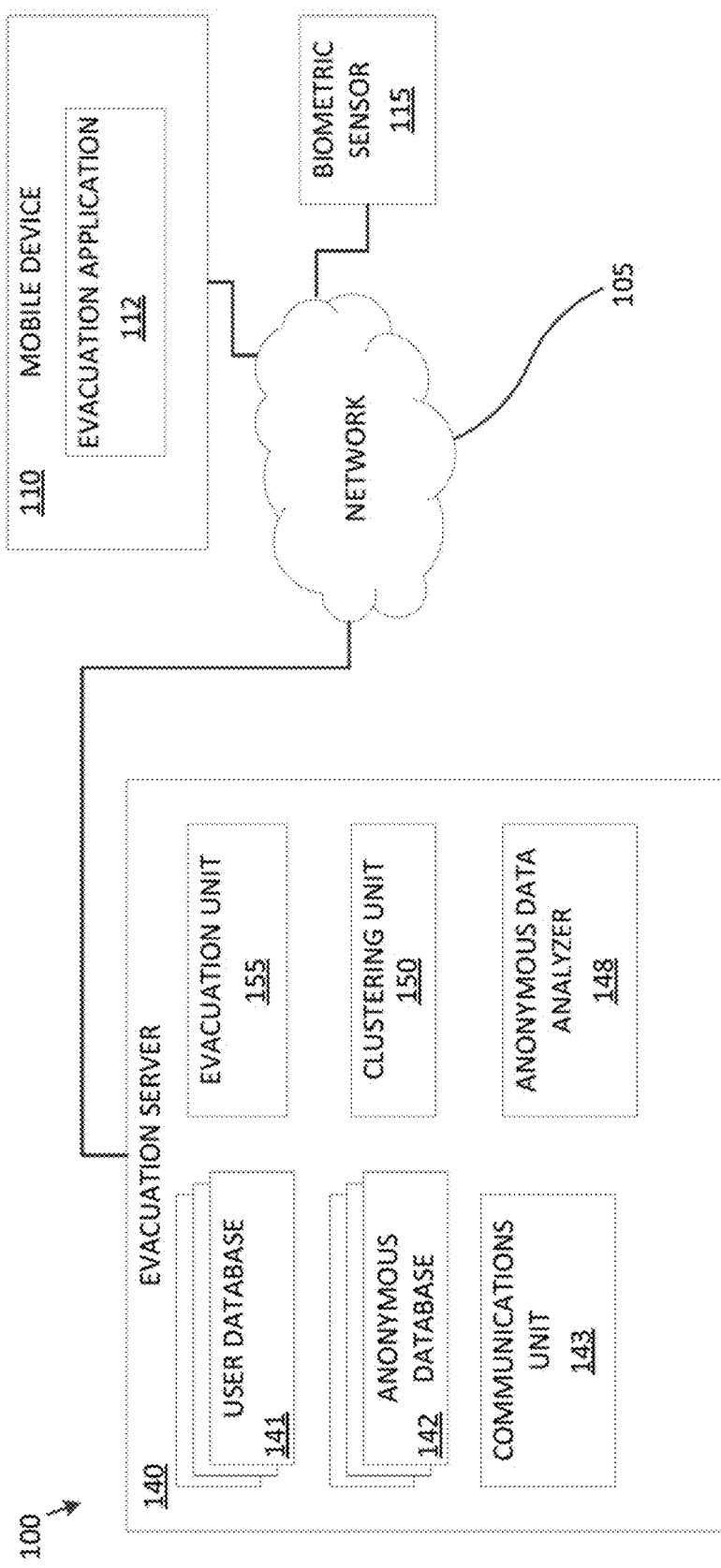
FIG. 1 is a functional block diagram illustrating an evacuation processing environment, in accordance with an embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Reference will now be made in detail to the embodiments of the present invention, examples of which are illustrated in the accompanying drawings, wherein like reference numerals refer to like elements throughout. Embodiments of the invention are generally directed to a system for determining, transmitting, and planning evacuation of people based on a cluster analysis of the people. A user installs an evacuation application on their mobile device, where the user is given the option of entering personal data to be sent to the evacuation server or the user allows the application to passively collect anonymous data. Data is collected from the population of a geographical area to determine the demographics of the population of the geographical area. The data can be collected in an opt-in process, e.g. the user submits their information, or the data can be collected anonymously, i.e. global position system (GPS) reference coordinates can be collected from the user mobile device. The evacuation server receives the user inputted data from the user mobile device and stores it in a user database. The user submits different types of information, for example, number of family members, age of family members, transportation options, fitness level, health, or other information.

The evacuation server receives the anonymous data from the user mobile devices that did not opt-in and provide any user inputted information and stores it in the anonymous database. The evacuation server analyzes the anonymous data, for example, the anonymous data can be GPS coordinates, to interpret different types of information about the people from the GPS coordinates. For example, if the GPS coordinates show multiple trips to a playground then the server concludes that a family can be associated with those GPS coordinates, if the GPS coordinates show multiple trips to the gym then the server concludes a higher fitness level associated the those GPS points, or for example, if the GPS coordinates show multiple trips to a medical complex (doctor's office, urgent care, hospital) then the server concludes the health status is at a lower level associated with the GPS coordinates.

The clustering unit analyzes the aggregated data from both the user inputted data and the evaluated anonymous data. The clustering unit makes a plurality of different K-means cluster graphs based on the aggregated data. Different cluster graphs can be based on different factors, for example, it can be one factor such as age, or it can be multiple factors such as age and health. Through the cluster analysis the evacuation server can extrapolate different conclusions about the demographics of a population for certain geographical areas associated with the aggregated data.

During a time when people need to evacuate from a geographical region, the evacuation server sends an evacuation destination to the user mobile device. The evacuation destination for each user is based on the cluster analysis of the data. For example, if the cluster analysis shows that people in one area have a higher probability of good health and being part of multi-person family then the evacuation destination can be a first location. If the cluster analysis shows an older population density, then the evacuation destination can be a second location that is different than the first location. If the cluster analysis shows a population having health issues, then the evacuation destination can be a third location. The evacuation server shares the information with first responders, thus allowing the first responders to better direct their resource to needs at the different evacuation locations. For example, if the first location is where most of the families are being sent, then the first responders can direct baby food, diapers, kids clothing, or other materials needed to help care for families. If the second destination is where most of the people having health issues are sent, then the first responders can direct more medical supplies and medical professionals to that location. If the third location is directed to an older population, then the first responder can direct adult clothing and supplies to that location while keeping the older population from the louder location where the families are located.

When a user requests an evacuation destination location, then the evacuation server transmits a location based on the user information, if provided, and the cluster analysis of the geographical region. For example, if a region has a higher density of families and its good health then it recommends one evacuation destination since the user has a higher probability of being part of the same cluster. In the situation of an unknown user, i.e. there has been insufficient data collected, when the user requests an evacuation destination the user transmits their current GPS location. The evacuation server utilizes a Gaussian Mixture Model determine a probability of which cluster then unknown user is part of and transmits an evacuation destination based on the determine probable cluster.

FIG. 1 is a functional block diagram illustrating an evacuation processing environment 100, in accordance with an embodiment of the present invention.

Network 105 can be, for example, a local area network (LAN), a wide area network (WAN) such as the Internet, or a combination of the two, and can include wired, wireless, or fiber optic connections. In general, network 105 can be any combination of connections and protocols that will support communications between a mobile device 110 and an evacuation server 140.

The mobile device 110 may be a laptop computer, tablet computer, netbook computer, personal computer (PC), a desktop computer, a personal digital assistant (PDA), a smart phone, or any programmable electronic device capable of communicating with the evacuation server 140 via network 105. Mobile device 110 may include internal and external hardware components, as depicted, and described in further detail with respect to FIG. 4. The mobile device 110 downloads and installs evacuation application 112. The evacuation application 112 gives the user an option to input personal information about the user, for example, the information inputted information can include user age, the number and age of family members, the user health status, transportation means (i.e. access to a car), fitness level, or any other information the user would like to provide. The user could also have a smart device such as a smart watch connected to the mobile device 110. Most smart devices contain biometric sensors 115 that can generate health data relating to the user to be utilized by an application on mobile device 110. The health data collected by the biometric sensor 115 can be transmitted by the mobile device 110 to the evacuation server 140, via the network 105. The user provided information is strictly an opt-in option, such that the user does not have to provide any personal information.

When the user decided not to provide any information, then the evacuation application 112 would let the user know that Global Position coordinates (GPS) data coordinates would be anonymous collected and transmitted to the evacuation server 140. The GPS data would be sent to the evacuation server 140, via the network 105. The anonymous data does not contain any information that would identify the user, the anonymous data is comprised of just the GPS coordinates.

Figure 5:
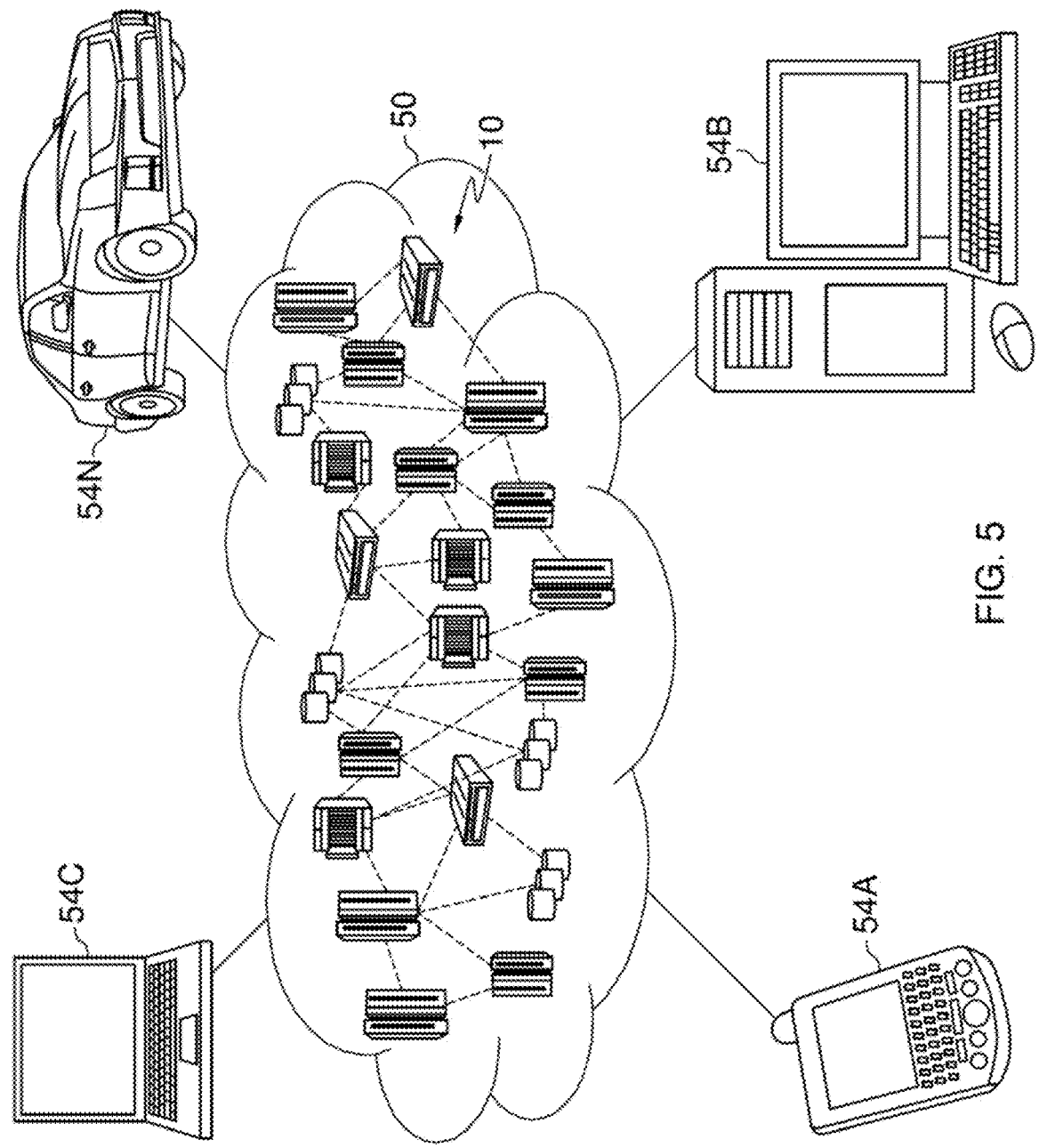
FIG. 5 depicts a cloud computing environment according to an embodiment of the present invention.
Figure 6:
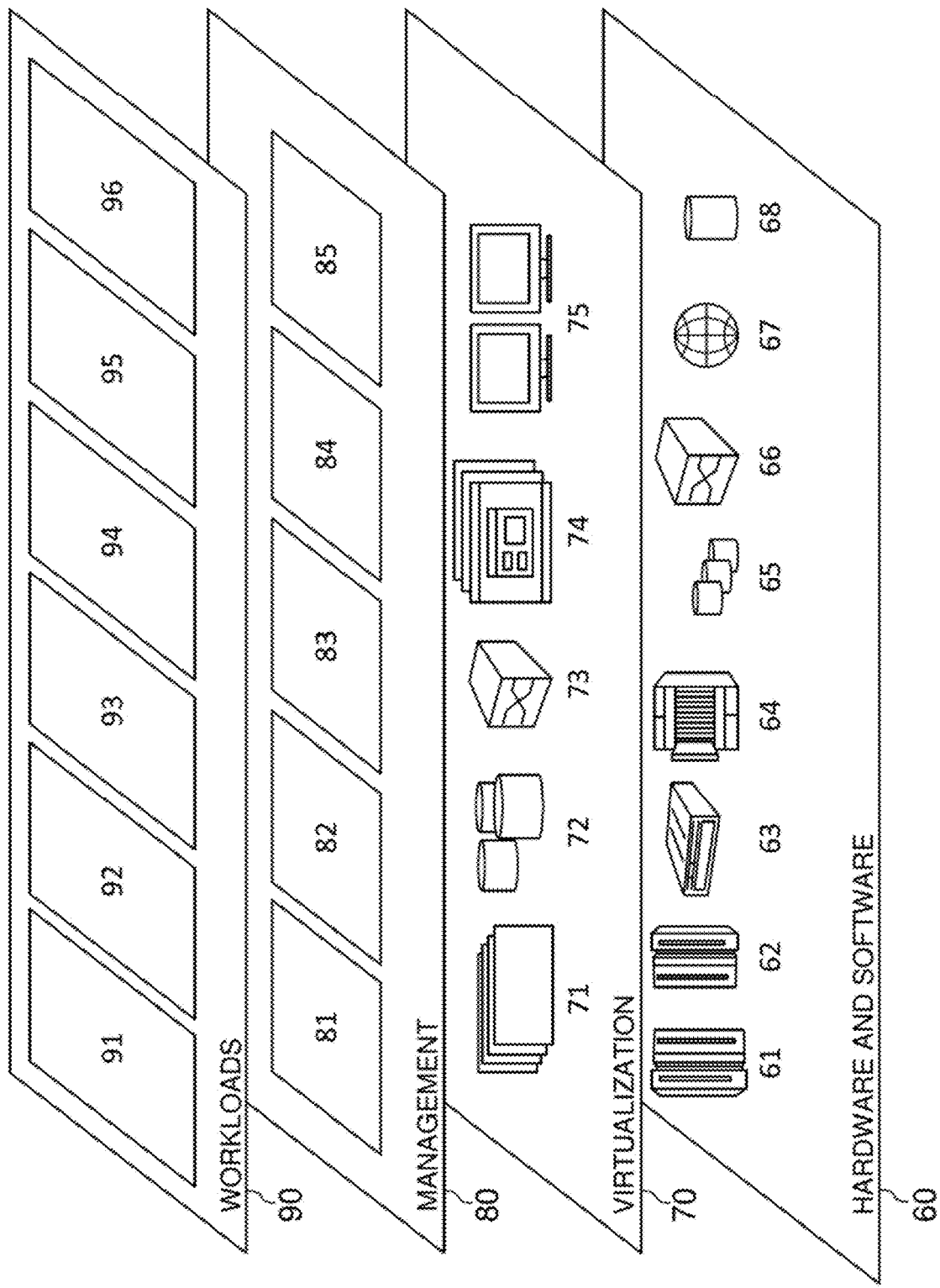
FIG. 6 depicts abstraction model layers according to an embodiment of the present invention.

The evacuation server 140 includes a user database 141, an anonymous database 142, a communications unit 143, an anonymous data analyzer 148, a clustering unit 150, and an evaluation unit 155. The evacuation server 140 include internal and external hardware components, as depicted, and described in further detail below with respect to FIG. 4, and operate in a cloud computing environment, as depicted in FIGS. 5 and 6.

The user database 141 is a datastore that stores the information that the user has provided. The anonymous database 142 is a datastore that stores anonymous data, for example, GPS coordinates, received from the mobile devices 110 and stores the generated conclusions from the anonymous data analyzer 148. The communications unit 143 allows the transmission and receiving data from the mobile device 110, via the network 105.

The anonymous data analyzer 148 analyzes the data stored in the anonymous database 142. The anonymous data analyzer 148 tries to draw conclusion about the demographics of the geographical area from the anonymous data. For example, if the GPS coordinates correspond to multiple locations outside the geographical area, then the anonymous data analyzer 148 draws the conclusion that the people tend to travel and probably have a vehicle. Another example, if the GPS coordinates correspond to playgrounds, then the anonymous data analyzer 148 draws the conclusion that there is a high probability of young children associated with those coordinates. Another example, if the GPS coordinates correspond to multiple trips to medical facilities (doctor's office, urgent care, hospital), then the anonymous data analyzer 148 draws the conclusion that health issues are associated with those coordinates. The GPS data stored in anonymous database 142 allows for the anonymous data analyzer 148 to draw multiple conclusions about the demographics of a geographical area based only on the GPS coordinates.

Figure 2A:
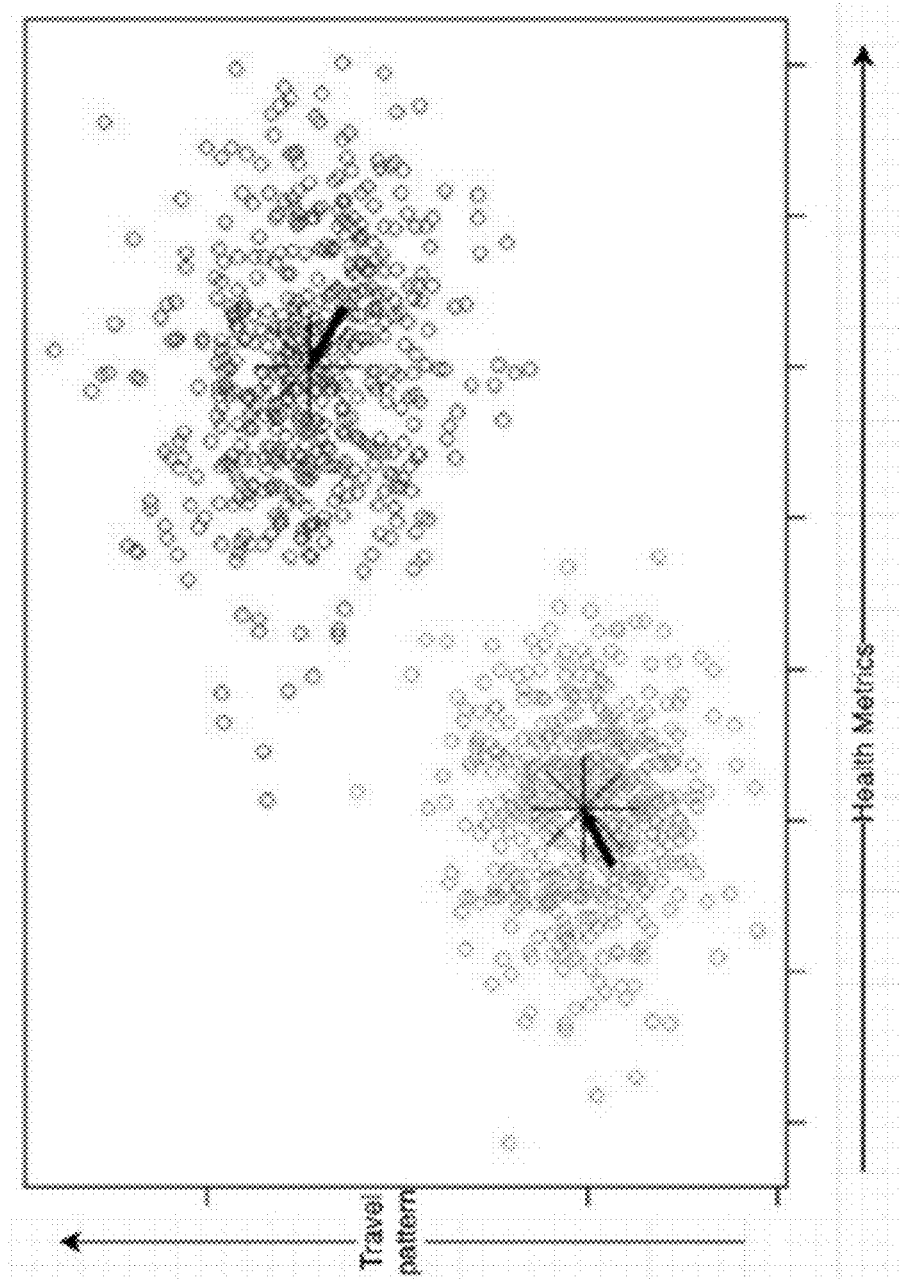
FIG. 2A illustrates an exemplar cluster graph based on the aggregated data, in accordance with an embodiment of the present invention.
Figure 2B:
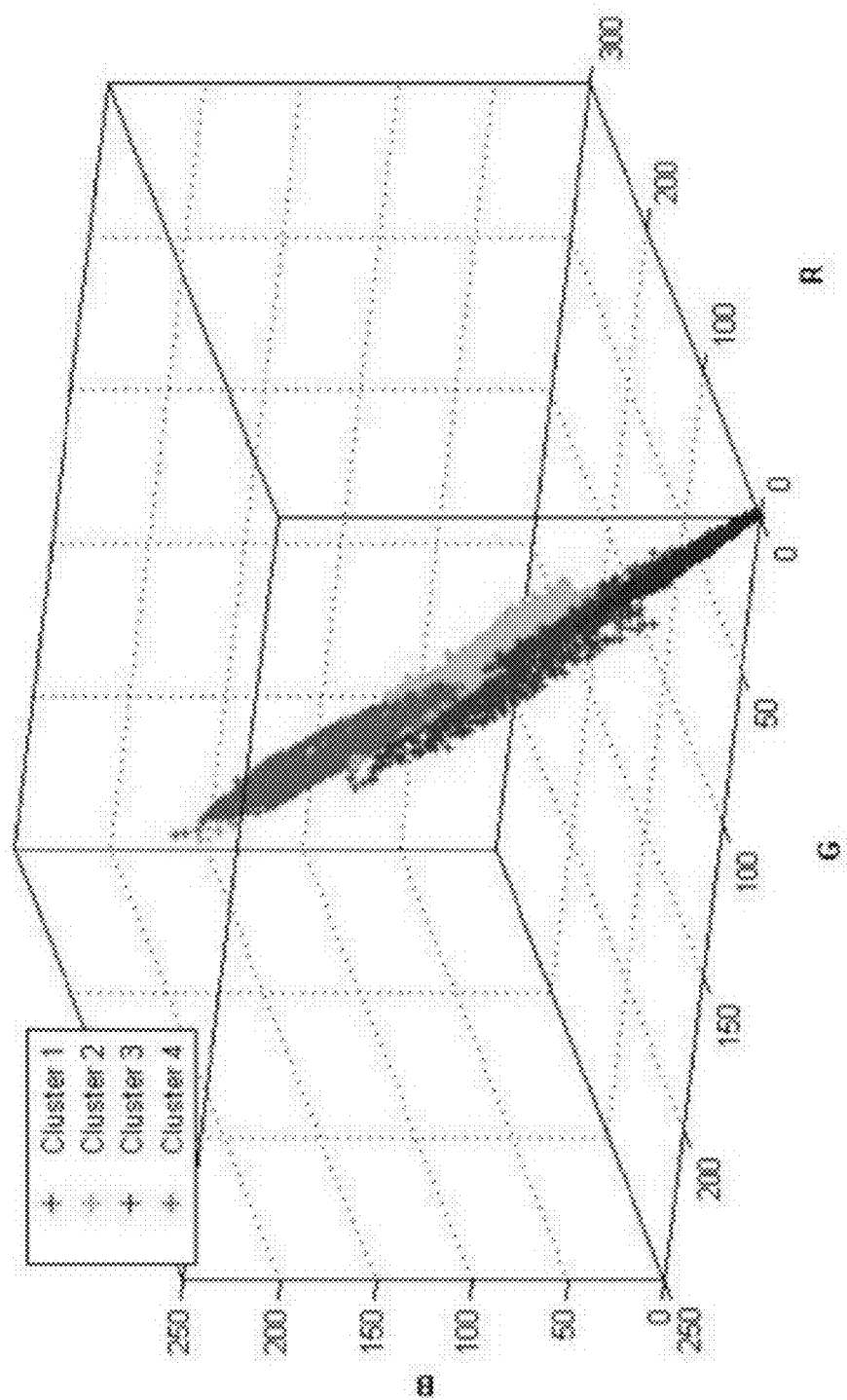
FIG. 2B illustrates overlaying multiple cluster graphs together, in accordance with an embodiment of the present invention.

The clustering unit 150 performs a K-means clustering analysis of the aggregated demographic data from user database 141 and the anonymous database 142. K-means clustering is a method of vector quantization, originally from signal processing, that aims to partition n observations into k clusters in which each observation belongs to the cluster with the nearest mean (cluster centers or cluster centroid), serving as a prototype of the cluster. This results in a partitioning of the data space into Voronoi cells. FIG. 2A illustrates an exemplar cluster graph that can be generated by the clustering unit 150 and FIG. 2B illustrates overlaying multiple cluster graphs together that allows for a Gaussian mixture model to be applied to the combined data, which will be described in further detail below.

The evacuation unit 155 receives the generated clusters from the clustering unit 150 and the evacuation unit 155 receives information from the first responders where the evacuation destinations are being set up. The generated clusters show the demographics for the geographical area associated with the data that was used to generate the clusters, and the evacuation unit 155 determines how the people in the geographical region should be divided between the evacuation destinations based on the determined demographics for the geographical region. For example, if the demographics shows a first area has a high infection rate of a disease and shows a second area that does not have infection rate, then the evacuation unit 155 determines people from the first area should go to one evacuation destination and people from the second area should go to a different evacuation destination. When a user utilizes evacuation application 112 requesting an evacuation destination, the evacuation unit 155 determines the evacuation destination for the user based on any known information of the user (i.e. if the user opted in and provided information) and demographics of the area of the user. For the situation when the user did not opt-in to provide any information (i.e. only anonymous data was collected) or when the user is new (i.e. just installed the application for the current evacuation conditions), the evacuation unit 155 applies a Gaussian mixture model to the clusters generated by the clustering unit 150. Gaussian mixture model is a probabilistic model for representing the presence of subpopulations within an overall population, without requiring that an observed data set should identify the sub-population to which an individual observation belongs. Formally a mixture model corresponds to the mixture distribution that represents the probability distribution of observations in the overall population. However, while problems associated with "mixture distributions" relate to deriving the properties of the overall population from those of the sub-populations, "mixture models" are used to make statistical inferences about the properties of the sub-populations given only observations on the pooled population, without sub-population identity information. The evacuation unit 155 utilizes the Gaussian mixture model to determine the demographics of the user.

Then the user utilizes the evacuation application 112 to indicate if they have access to transportation (i.e. a car) or if they require a pick and transportation to an evacuation destination. When the user has indicated that they have access to transportation, then the evacuation unit 155 determines the evacuation destination for the user based on the demographics of the user and transmits the evacuation destination to the user mobile device 110.

When the user request transportation the type of need transportation will affect how the evacuation unit 155 determines how to arrange transportation for the user. In the situation when the user has provided information into the evacuation application 112, then the evacuation unit 155 can determine if the user requires specialized transportation or if non-specialized transportation can used. Specialized transportation can be, for example, a bus or vehicle that can transport a wheelchair, a bus or vehicle that has a handicap ramp, or it can be an ambulance that is needed to for a person bed bound. The evacuation unit 155 determines how many spots are on the specialized transport and determines a route for the specialized transport to pick up evacuees. The evacuation unit 155 transmits the pickup location to the evacuation application 112 on the mobile device 110. When specialized transportation is not needed, then the evacuation unit 155 determines routes to pick up evacuees based on the determine evacuation destination of the evacuee. The evacuation unit 155 transmits the evacuation destination and the pickup time and location to the user mobile device 110.

In the situation where the user is requesting transport and the user has not provided any information beside anonymous data or if the user is a new user, then the evacuation unit 155 utilizes the cluster generated by the clustering unit 150 to determine the probability of the type of transport that is needed for the user based on the determined demographics for the clusters. The evacuation unit 155 applies a Gaussian mixture model to the clusters generated by the clustering unit 150 to determine the probability of which demographic group the user belongs to. Based on the determined demographics for the user, then the evacuation unit 155 determines which of the evacuation destination the user should go to and which type of transportation should transport the user to the destination. For example, the evacuation unit 155 might determine that the user has a high probability of being physically disabled based on the cluster analysis, thus the evacuation unit 155 determines that specialized transportation is needed to transport the user to the evacuation destination. The evacuation unit 155 determines the route for the specialized transportation to pick up different evacuee/users. The evacuation unit 155 transmits the pickup location to the evacuation application 112 on the mobile device 110. When the evacuation unit 155 determines that the user/evacuee does not require a specialized transportation based on the cluster analysis then the evacuation unit 155 determines the route for the transportation to pick up different evacuee/users based on the determined evacuation destination. The evacuation unit 155 transmits the pickup location to the evacuation application 112 on the mobile device 110.

Figure 3:
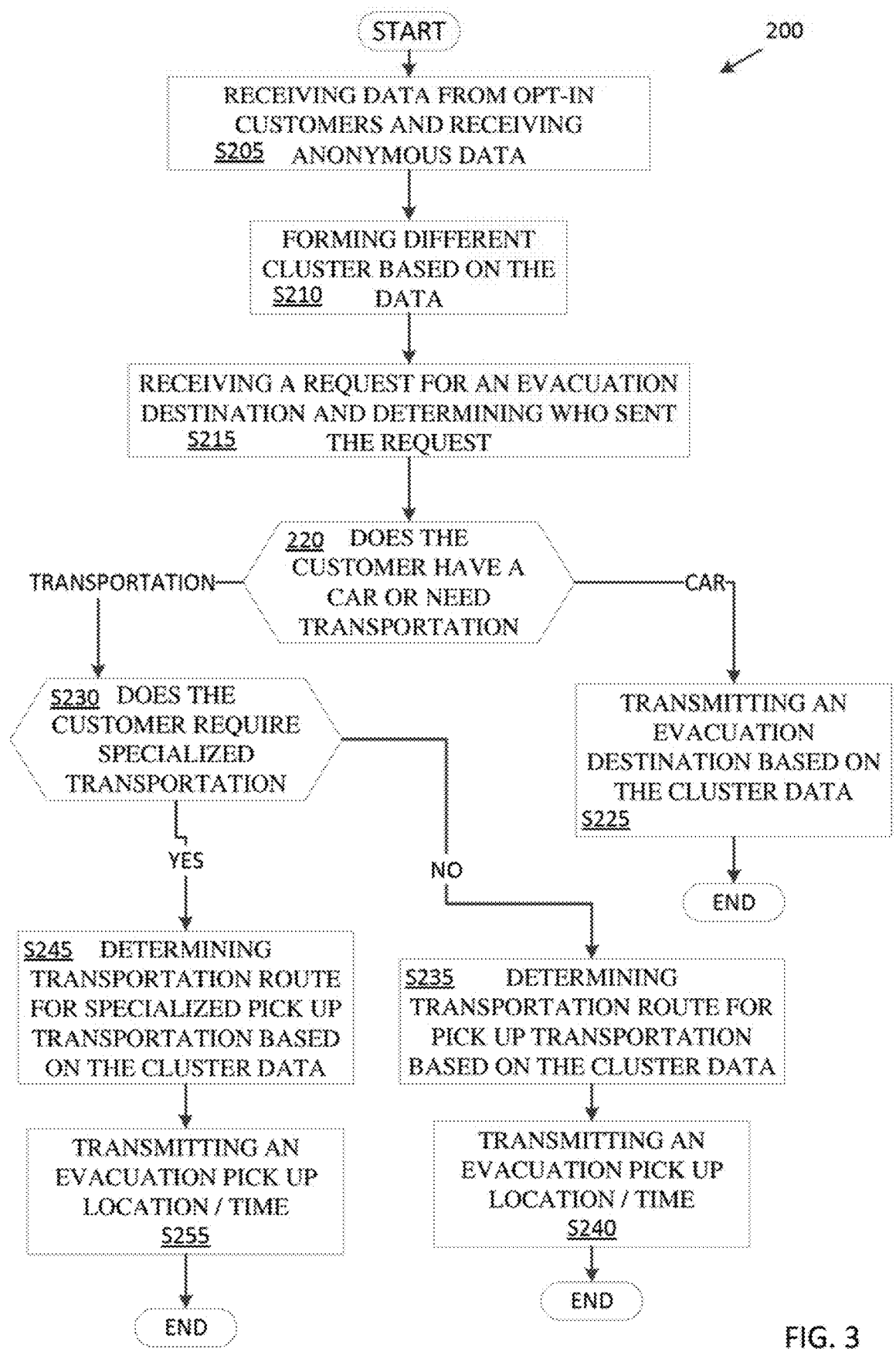
FIG. 3 is a flowchart depicting operational steps determining an evacuation destination based on a cluster analysis within the evacuation processing environment of FIG. 1, in accordance with an embodiment of the present invention.

FIG. 3 is a flowchart depicting operational steps determining an evacuation destination based on a cluster analysis within the evacuation processing environment of FIG. 1, in accordance with an embodiment of the present invention.

The user downloads and installs the evacuation application 112 on the mobile device 110. When launching the application, the user is given the option to opt-in and provide demographic information about the user, or the user is given warning that anonymous data (for example, GPS coordinates) would be collected from the mobile device 110. The evacuation server 140 receives the user provided data and stores it in the user database 141 and evacuation server 140 receives the anonymous data from the user mobile device 110 and stores it in the anonymous database 142 (S205). The user provided data is updated when a user modifies or adds new data, and the anonymous data is periodically received by the evacuation server 140 for the mobile device 110. The anonymous data analyzer 148 analyzes the anonymous data to draw conclusion based on the data as explained above. The clustering unit 150 analyzes the aggregated data (anonymous and user provided) to form clusters for the geographical region relating to the data (S210). The formed clusters illustrate the demographics for the geographical region. The evacuation server 140 receives a request from the evacuation application 112 for an evacuation destination (S215). The evacuation unit 155 determines who sent the request. The request could have been sent by a user who provided information, a user who only provided anonymous data, or a new user (S215). The evacuation unit 155 determines if the user has a car or requires transportation to the evacuation destination (S220). The evacuation unit 155 determines if the user has a car based on the user provided information or by applying a Gaussian mixture model to the generated clusters to determine the probability that the user has access to a car (S220). When the user has been determined that they have access to a car then the evacuation unit determines the evacuation destination that is appropriate for the user. The evacuation unit 155 determines how the populous of a geographical region should be divided based on the demographics of the generated clusters. The evacuation unit 155 determines which evacuation destination the user should be assigned to based on the demographics. When the user has provided information about their demographics then the evacuation unit 155 determines the evacuation destination the user should go to based on the user provided demographics and the determined demographics for the geographical region. The evacuation server 140 transmits the evacuation destination to the evacuation application 112 on the user mobile device 110 (S225). When the user has only provided anonymous data or is a new user, then the evacuation unit 155 applies Gaussian mixture model to the cluster model to determines the demographics of the user within a certain probability. The evacuation unit 155 determines which evacuation destination the user should go to based on the determined demographics of the user and transmits the destination to the evacuation application 112 on the user mobile device 110 (S225).

The evacuation unit 155 can determine if the user needs transportation by a user input or by determining the probability that the user requires transportation by applying Gaussian mixture model to the determined cluster. When it is determined that the user requires transportation, then the evacuation unit 155 determines if the user requires specialized transportation (S230). Specialized transportation can be an ambulance, wheelchair accessible, or handicap accessible transportation. The evacuation unit 155 determines the user requires specialized transportation by the user provided information or by applying a Gaussian mixture model to the cluster to determine the probability that the user requires specialized transportation. If the probability is greater than or equal to a threshold value, then the evacuation unit determines that user requires specialized transportation (S230). When it is determines that the user does not require specialized transportation then the evacuation unit 155 determines the evacuation destination for the user based on the determined demographics of the user. The evacuation unit 155 determines number and location of each user going to the different evacuation destination and determines a route for the transportation to pick up each user (S235). The evacuation unit 155 transmits the pickup location to the user and transmits the route, pick up locations, the evacuation destination to the transport (S240). When specialized transportation is required, then the evacuation unit 155 determines which type of specialize transportation is needed (since the capacity of the specialize transportation differs based on the type of transportation). The evacuation unit 155 determines the evacuation destination for the user based on the determined demographics of the user. The evacuation unit 155 determines a route for the specialized transportation to pick up each user based on the capacity of the specialized transportation (S245). The evacuation unit 155 transmits the pickup location to the user and transmits the route, pick up locations, the evacuation destination to the specialized transport (S250).

Figure 4:
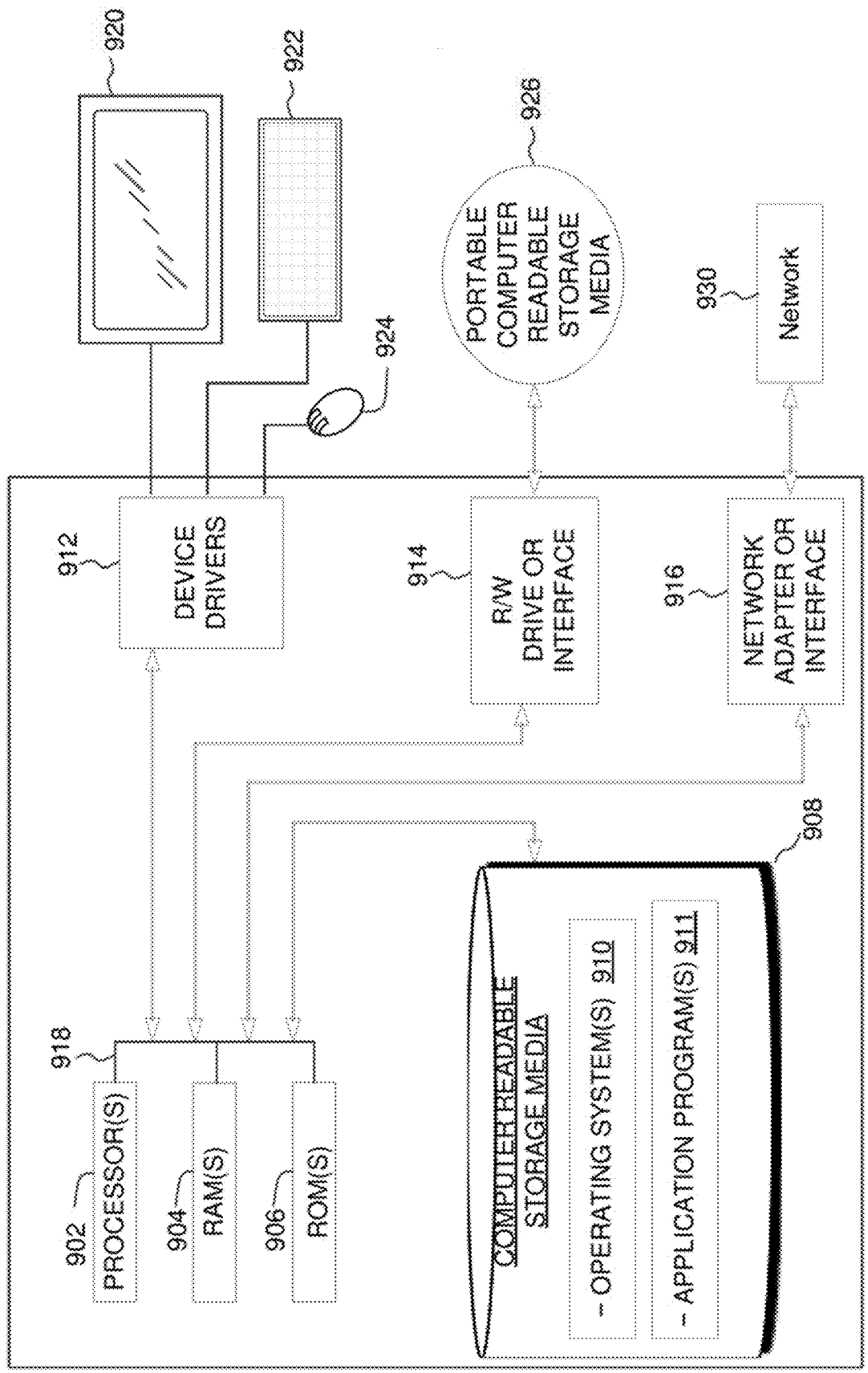
FIG. 4 is a block diagram of components of a computing device of the evacuation processing environment of FIG. 1, in accordance with embodiments of the present invention.

FIG. 4 depicts a block diagram of components of evacuation server 140 of the evacuation processing environment 100 of FIG. 1, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Evacuation server 140 and mobile device 110 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. The network adapter 916 communicates with a network 930. Communications fabric 918 may be implemented with any architecture designed for passing data and/or control information between processors (such as microprocessors, communications, and network processors, etc.), system memory, peripheral devices, and any other hardware components within a system.

One or more operating systems 910, and one or more application programs 911, for example, evacuation unit 155 (FIG. 1), are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Evacuation server 140 and mobile device 110 may also include a R/W drive or interface 914 to read from and write to one or more portable computer readable storage media 926. Application programs 911 on evacuation server 140 and mobile device 110 may be stored on one or more of the portable computer readable storage media 926, read via the respective R/W drive or interface 914 and loaded into the respective computer readable storage media 908.

Evacuation server 140 and mobile device 110 may also include a network adapter or interface 916, such as a Transmission Control Protocol (TCP)/Internet Protocol (IP) adapter card or wireless communication adapter (such as a 4G wireless communication adapter using Orthogonal Frequency Division Multiple Access (OFDMA) technology). Application programs 911 on evacuation server 140 and mobile device 110 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Evacuation server 140 and mobile device 110 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and evacuation unit 96.

Based on the foregoing, a computer system, method, and computer program product have been disclosed. However, numerous modifications and substitutions can be made without deviating from the scope of the present invention. Therefore, the present invention has been disclosed by way of example and not limitation.

While the invention has been shown and described with reference to certain exemplary embodiments thereof, it will be understood by those skilled in the art that various changes in form and details may be made therein without departing from the spirit and scope of the present invention as defined by the appended claims and their equivalents.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the one or more embodiment, the practical application or technical improvement over technologies found in the marketplace, or to enable others of ordinary skill in the art to understand the embodiments disclosed herein.

What is claimed is:

1. A method for determining an evacuation destination for an evacuee, the method comprising:
   generating, by a computer, a plurality of clusters for a geographical region based on data received from a plurality of mobile devices;
   determining, by the computer, the demographics for the geographical region based on generated plurality of clusters;
   receiving, by the computer, a request for an evacuation destination from an evacuee mobile device;
   selecting, by the computer, the evacuation destination from a plurality of evacuation destination based on the demographics of the evacuee and the demographics of the geographical region; and
   transmitting, by the computer, the selected evacuation destination to the evacuee mobile device.

2. The method of claim 1, wherein each of the plurality of evacuation destination are designated for different demographic groups within the geographical region.

3. The method of claim 2, wherein the different demographic groups are based on the generated cluster for the geographical region.

4. The method of claim 1, wherein the demographics for the evacuee are determined, by the computer, by applying a mixture model to the generated clusters to determine probability that the evacuee has certain demographics.

5. The method of claim 4, wherein the mixture model is a Gaussian mixture model.

6. The method of claim 1, further comprising:
   receiving, by the computer, a request for transportation from the evacuee.

7. The method of claim 6, further comprising:
   determining, by the computer, a type of transportation need for the evacuee, wherein the type of transportation is determined from the demographics for the evacuee, wherein the type of transportation is selected from either a specialized transportation or a normal transportation.

8. The method of claim 7, further comprises:
   determining, by the computer, a route for transporting the evacuee to the selected evacuation destination; and
   determining, by the computer, a pickup location and a pickup time for the evacuee;
   wherein the transmitting, by the computer, the selected evacuation destination to the evacuee mobile device further comprises transmitting, by the computer, the pickup location and the pick up time for the transportation to the evacuation destination.

9. A computer program product for determining an evacuation destination for an evacuee, the computer program product comprising:
   one or more non-transitory computer-readable storage media and program instructions stored on the one or more non-transitory computer-readable storage media, the program instructions comprising:
   program instructions to generate a plurality of clusters for a geographical region based on data received from a plurality of mobile devices;
   program instructions to determine the demographics for the geographical region based on generated plurality of clusters;
   program instructions to receive a request for an evacuation destination from an evacuee mobile device;
   program instructions to select the evacuation destination from a plurality of evacuation destination based on the demographics of the evacuee and the demographics of the geographical region; and
   program instructions to transmit the selected evacuation destination to the evacuee mobile device.

10. The computer program product of claim 9, wherein each of the plurality of evacuation destination are designated for different demographic groups within the geographical region.

11. The computer program product of claim 10, wherein the different demographic groups are based on the generated cluster for the geographical region.

12. The computer program product of claim 9, wherein the demographics for the evacuee are determined by applying a mixture model to the generated clusters to determine probability that the evacuee has certain demographics.

13. The computer program product of claim 12, wherein the mixture model is a Gaussian mixture model.

14. The computer program product of claim 9, further comprising:
program instructions to receive a request for transportation from the evacuee.

15. The computer program product of claim 14, further comprising:
program instructions to determine a type of transportation need for the evacuee, wherein the type of transportation is determined from the demographics for the evacuee, wherein the type of transportation is selected from either a specialized transportation or a normal transportation.

16. The computer program product of claim 15, further comprises:
program instructions to determine a route for transporting the evacuee to the selected evacuation destination;
program instructions to determine a pickup location and a pickup time for the evacuee; and
wherein the program instructions to transmit the selected evacuation destination to the evacuee mobile device further comprises program instructions to transmit the pickup location and the pickup time for the transportation to the evacuation destination.

17. A computer system for determining an evacuation destination for an evacuee, the computer system comprising:
one or more computer processors, one or more computer-readable storage media, and program instructions stored on one or more of the computer-readable storage media for execution by at least one of the one or more processors, the program instructions comprising:
program instructions to generate a plurality of clusters for a geographical region based on data received from a plurality of mobile devices;
program instructions to determine the demographics for the geographical region based on generated plurality of clusters;
program instructions to receive a request for an evacuation destination from an evacuee mobile device;
program instructions to select the evacuation destination from a plurality of evacuation destination based on the demographics of the evacuee and the demographics of the geographical region; and
program instructions to transmit the selected evacuation destination to the evacuee mobile device.

18. The computer system of claim 17, wherein each of the plurality of evacuation destination are designated for different demographic groups within the geographical region.

19. The computer system of claim 18, wherein the different demographic groups are based on the generated cluster for the geographical region.

20. The computer system of claim 19, wherein the demographics for the evacuee are determined by applying a mixture model to the generated clusters to determine probability that the evacuee has certain demographics.

* * * * *